United States Patent [19]

Brandelli

[11] 4,200,123
[45] Apr. 29, 1980

[54] BALL-TYPE FAUCET

[76] Inventor: Anthony R. Brandelli, 2418 W. 256th St., Lomita, Calif. 90717

[21] Appl. No.: 949,741

[22] Filed: Oct. 10, 1978

[51] Int. Cl.² .................................. F16K 11/087
[52] U.S. Cl. .............................. 137/625.4; 137/616; 137/343; 239/428.5; 239/587
[58] Field of Search ............... 137/625.4, 625.41, 616, 137/616.7, 801, 343; 251/349, 351; 239/587

[56] References Cited
U.S. PATENT DOCUMENTS

| | | | |
|---|---|---|---|
| 3,334,818 | 8/1967 | Moen | 239/587 X |
| 3,461,901 | 8/1969 | Bucknell et al. | 137/801 X |
| 4,043,359 | 8/1977 | Christo | 137/625.4 X |

Primary Examiner—Arnold Rosenthal
Attorney, Agent, or Firm—Fulwider, Patton, Rieber, Lee & Utecht

[57] ABSTRACT

There is disclosed a faucet of the "washerless" construction employing a spherical valve member in a hemispherical valve body in which the spherical valve member has only a single protruding tubular member that serves both as the valve member operator and the discharge nozzle for the faucet.

22 Claims, 12 Drawing Figures

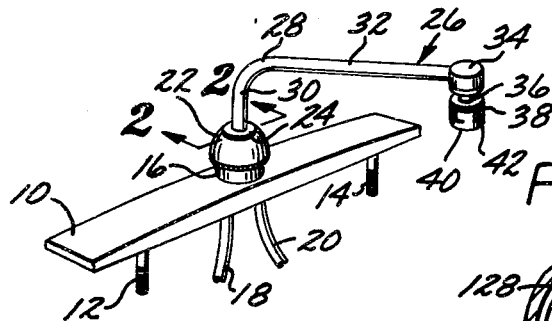
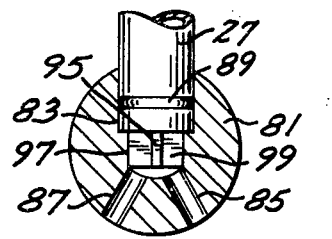
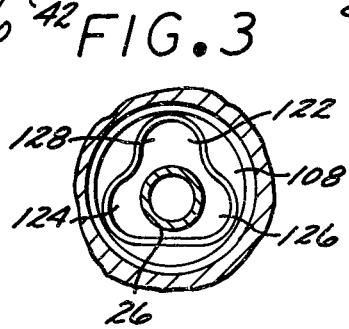
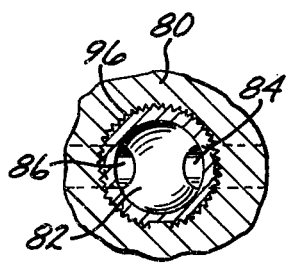
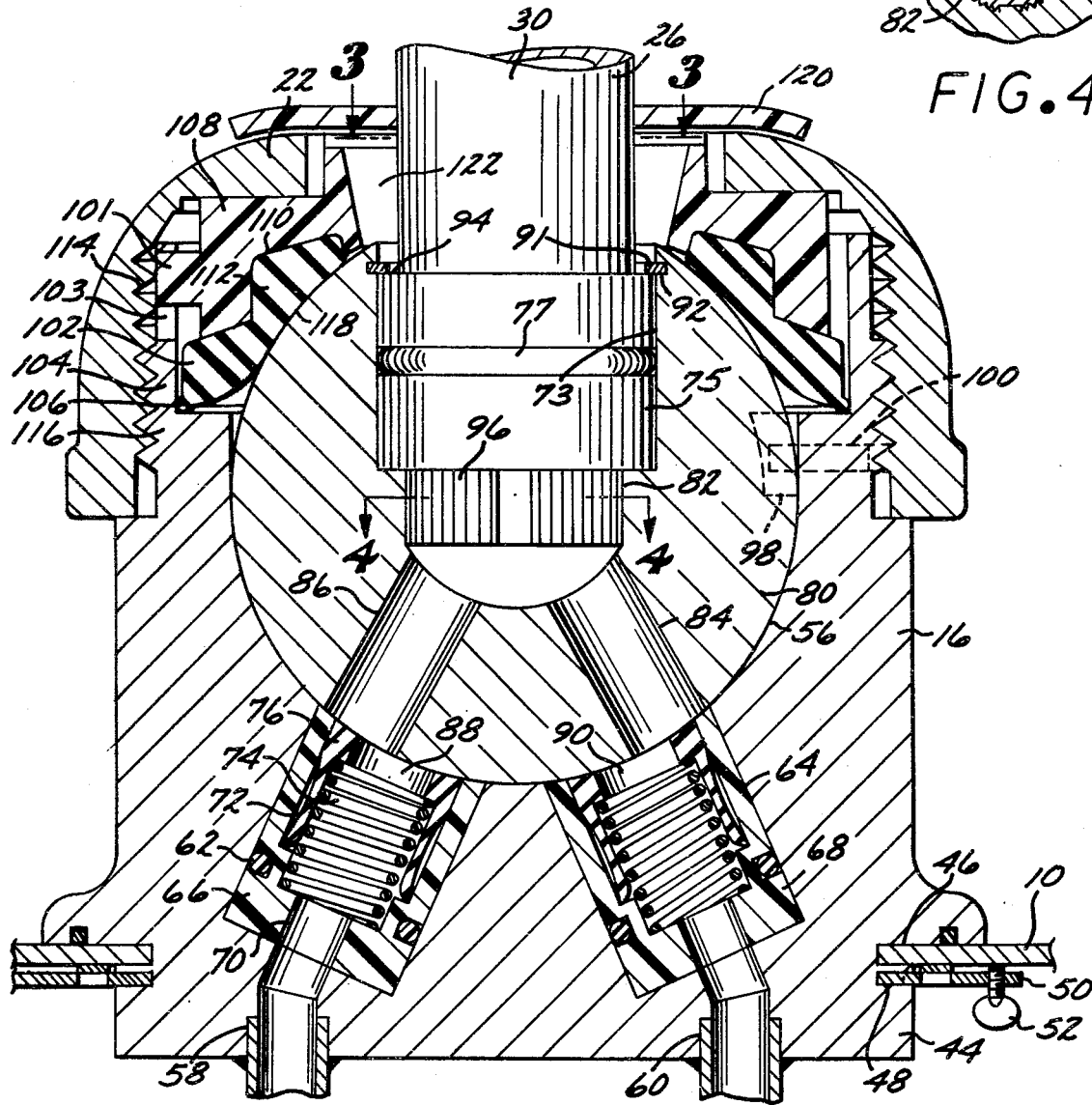

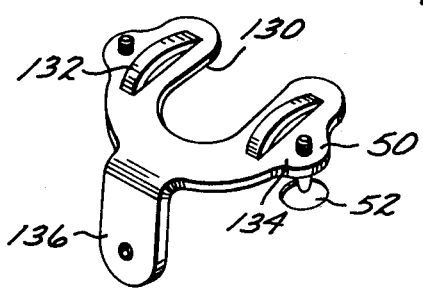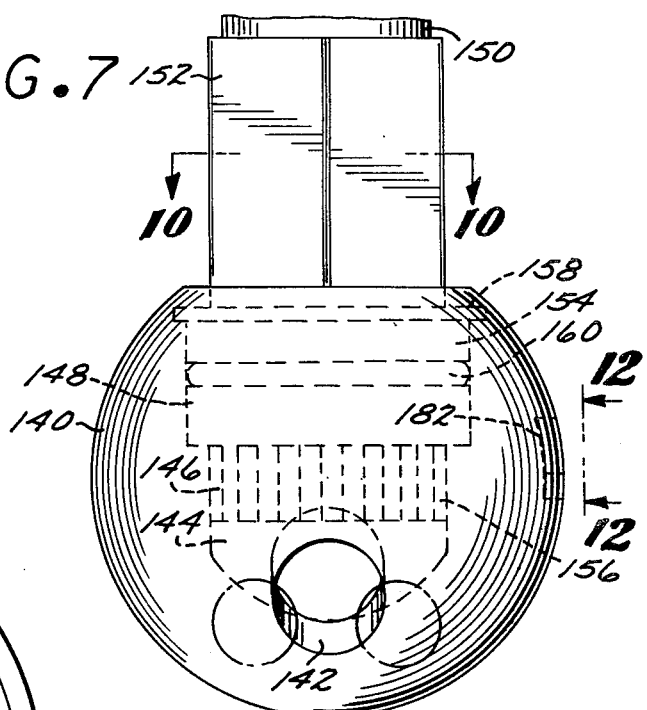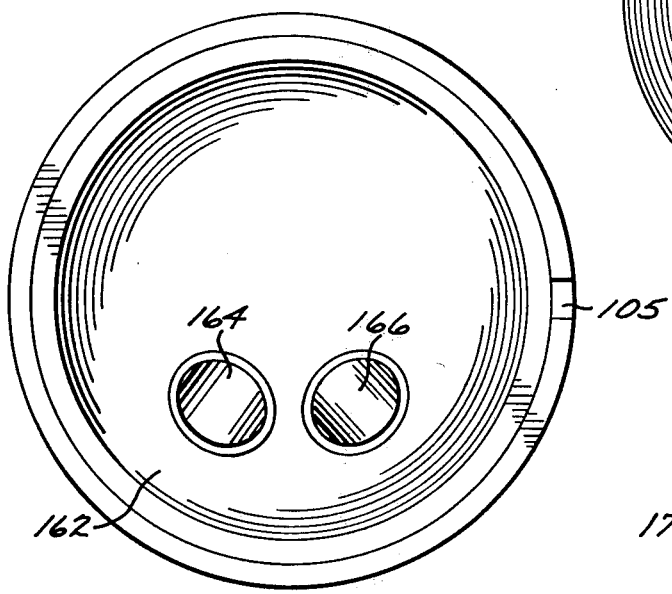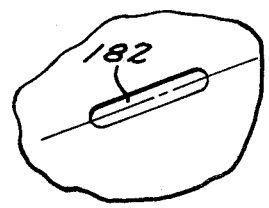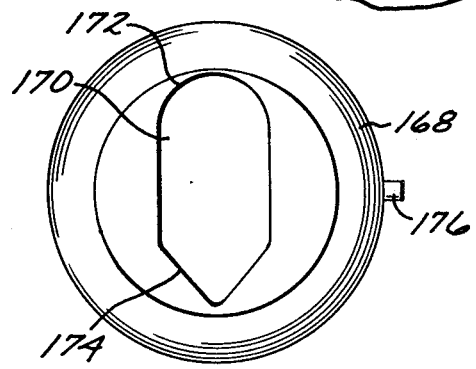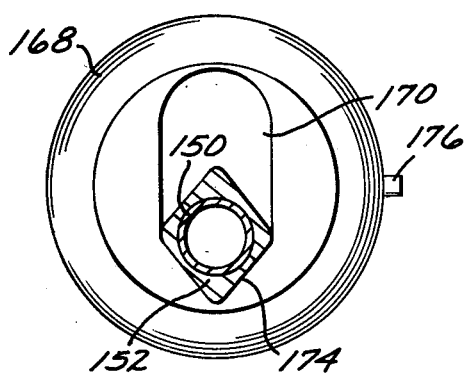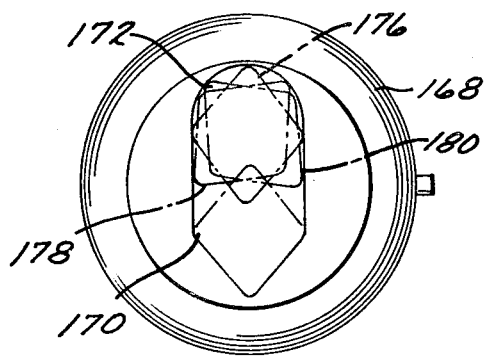

BALL-TYPE FAUCET

BRIEF DESCRIPTION OF THE PRIOR ART

The "washerless" type of household or hospital faucet which has enjoyed considerable popularity in recent years employs a spherical valve member which is seated in a valve body having a hemispherical cavity to receive the valve member and a pair of inlet ports for hot and cold water. The valve member has a single discharge port and usually, two branch ports communicating therewith which coact with the inlet ports of the valve body whereby the valve member can be moved to align its branch ports with one or both of the valve body inlet ports and effect an infinite proportionating of the hot and cold water. The conventional valve body has a discharge port communicating with a nozzle and the moveable spherical valve member has its discharge port communicating with the nozzle during movement of this member. The movement of the spherical valve member is effected by a single lever which is secured to and which projects from the upper surface of the spherical ball member, through an annular seal and annular cover member that is threadably secured to the valve body.

BRIEF STATEMENT OF THE INVENTION

This invention comprises a valve of the aforedescribed "washerless" construction in which only a single member is provided to function both as the discharge nozzle of the faucet and as the valve member operator therefor. Accordingly, the construction comprises a valve body having two inlet ports which communicate with a hemispherical cavity. A spherical valve member is seated in the hemispherical cavity and this spherical valve member has a single outlet port communicating with diverting branch ports that coact with the inlet ports of the valve body. A single member is mounted in the outlet port of the valve member and this single member is tubular to function as the discharge nozzle of the faucet. The single member also functions as the manual operator for the valve member, projecting upwardly therefrom, through an annular seal and overlying cover member that is threadably secured to the valve body. Preferably, the single protruding member has a bent portion to provide upright and lateral legs and, most preferably, distally bears an adjustable flow deflector and/or an aerator. The flow detector and/or aerator is adjusted, if necessary, when the valve single protruding member is raised to an "on" position by one's index finger, the aerator being adjusted right and left and around by one's thumb and middle finger, thereby, there being no necessity at any time to use more than three fingers of one's hand to operate this faucet.

BRIEF DESCRIPTION OF THE DRAWINGS

The invention will be described with reference to the FIGURES of which:

FIG. 1 is a perspective view of the faucet of the invention;

FIG. 2 is an elevational, sectional view along lines 2—2 of FIG. 1;

FIG. 3 is a partial sectional view along lines 3—3 of FIG. 2;

FIG. 4 is a view along lines 4—4 of FIG. 2;

FIG. 5 is a sectional view of an alternative spherical valve member and protruding member assembly;

FIG. 6 is a perspective view of a retainer for use with the faucet of the invention;

FIG. 7 is a view of a spherical valve member and protruding member for an alternative valve structure;

FIG. 8 is a view of the hemispherical cavity for use with the valve member of FIG. 7;

FIG. 9 is a view of the upper valve member seal used with the embodiment of FIGS. 7–8;

FIGS. 10 and 11 illustrate the valve member of FIG. 7 in opposite ends of its travel in the faucet; and FIG. 12 is a view along lines 12—12 of FIG. 7.

DESCRIPTION OF PREFERRED EMBODIMENTS

Referring now to FIG. 1, the faucet of the invention is illustrated as including a basin coverplate 10 bearing downwardly dependent studs 12 and 14 for securing the plate to a wash basin and the like. The faucet has a valve body 16 to which are secured tubular members 18 and 20, commonly of flexible tubing such as copper tubing, for connection to the hot and cold water supply lines in a building. The valve body is surmounted by a generally hemispherically shaped cover member 22 having a central aperture 24 through which projects the single protruding member 26. The latter has a bent portion 28 to provide a substantially vertical leg 30 and a generally horizontal leg 32 which distally bears a discharge nozzle, in the form of a cylindrical fitting 34 having a hemispherical cavity (not shown) which receives the neck 36 of a directionally adjustable flow deflector 38 which can be adjusted right to left and around by the thumb and middle finger of one's hand. Preferably, the latter has a threaded end that receives an aeration nozzle 40 including aeration slots 42. The single protruding member 26 serves in the faucet of the invention as the discharge nozzle and as the valve member operator and can be operated by the index finger of one's hand positioned at the junction of leg 32 and fitting 34.

Referring now to FIG. 2, the structural detail of the faucet of the invention will be described in greater detail. As there illustrated, the basin coverplate 10 has an aperture which receives the neck 44 of the valve body 16. The neck has a slot 46 to receive this basin coverplate and a second slot 48 to receive the inner rim of a retainer clamp 50. The latter has a plurality of threaded apertures which receive threaded thumb screws 52, permitting the retainer 50 to be fixedly secured in the assembly.

The valve body 16 has a central hemispherical cavity 56 and first and second inlet ports 58 and 60 which communicate therewith through respective seal wells 62 and 64. The latter comprise large diameter counterbores which removeably receive cylindrical inserts 66 and 68. Each of the cylindrical inserts has a central bore 70 and a larger diameter counterbore 72. A resilient helical coil spring 74 is seated in each of the counterbores 72 and resiliently bears between the innerface thereof and the innerface of a resilient, cylindrical seal member 76. The latter has an arcuately concave face of a radius conforming to the radius of the spherical valve member 80 of the assembly to sealably engage thereagainst. The spherical ball member 80 has a central discontinuous bore 82 which communicates with radial, branch bores 84 and 86 that are angularly disposed to coact with the through bores 88 and 90, respectively of the cylindrical seals within wells 62 and 64. The spherical valve member 80 has a surface groove 98 in which is received pin 100 that is secured in body 16. The pin and groove coact to provide a directional restraint to the movement of the valve member 80.

The central bore 82 in valve member 80 preferably has an enlarged diameter portion 73 which receives an enlarged diameter end portion 75 of the single protruding member 26. The enlarged diameter portion has an annular groove in which is seated an O-ring seal 77 and the assembly is retained by a clip retainer 91 that seats in an annular groove 92 about the upper edge of the enlarged diameter bore 73, projecting over the shoulder 94 of the large diameter portion 75. The single protruding member 26 preferably has a splined lower end 96 which is received within a coacting internally splined wall of the central bore 82.

The valve member 80 is retained in the assembly and sealed therein by a generally annular sealing ring 102 which seats in an annular groove 104 about hemispherical cavity 56. Preferably, the lower edge of sealing ring 102 has a bulbous rim 106 that is compressed in a seal-tight relationship to annular groove 104 by guide ring 108. The latter has a central, lateral bore 110 which receives a coacting raised ridge 112 of the seal ring whereby the seal ring is secured thereto.

The assembly of seal ring 102 and guide ring 108 is received in the hemispherical cap 22 which has an internally threaded wall 114 which engages an externally threaded neck 116 of the valve body 16, to permit compression of the assembly and the sealing engagement of the arcuately concave inner surface 118 of seal ring 102 against the spherical surface of the valve member 80. The guide ring 108 is oriented in this assembly to the body 16 by a lateral tab 101 which is received in axial groove 103 of body 16. A splash ring 120 is provided in the assembly, secured to the upright leg 30 of the single protruding member 26 to overlie the central aperture 122 of the guide ring 108.

Referring now to FIG. 3, the shape of the central aperture 122 of the ring 108 will be described in greater detail. As there illustrated, this aperture is generally tri-lobed with arcuate lobes 124 and 126 and a third, equidistant lobe 128. The tubular, single protruding member 26 is circular in cross-section and has a radius conforming to the inner radius of the lobes of the aperture whereby the member can be moved into each of the arcuate recesses of the aperture 122 to provide for infinite proportionating of the liquid from conduits 18 and 20, shown in FIG. 1.

FIG. 4 is a partial, central, sectional view of the spherical ball member 80, illustrating the internal bottom of bore 82 and the interconnecting branch ports 84 and 86 and also illustrating the fluted interengagement of surface 96 with the internally fluted surface of the bore 82.

FIG. 5 illustrates an alternative assembly of a single protruding member 27 with a spherical valve member 81. In this construction, the branch ports 85 and 87 communicate with a central bore 83 through a square or rectangular receptacle 97. The lower end of single protruding member 27 can have a square or rectangular shank 99 which is received in the receptacle 97 and can also have a single or master spline 95 that is received in a coacting groove of the valve member 81. The lower end of the single protruding member 27 also bears an annular groove which receives an O-ring seal 89.

Referring now to FIG. 6, the lock plate 50 is illustrated in perspective view. As illustrated in FIG. 2, this lock plate is employed to secure the body of the faucet to the supporting structure. The lock plate 50 has an open slot 130 which receives the base 44 of the body 16. Preferably, the plate has resilient means such as the bent portions 132 which project upwardly, out of the plain of the lock plate 50 to provide resilient engagement with the valve body. The lock plate also has lateral ears 134 which have internally threaded bores to receive the thumb screws 52, thereby permitting tightening of the fixture to the supporting structure. Preferably, the lock plate 50 also has a dependent tab 136 to permit the plate to be grasped and readily inserted into place.

Referring now to FIGS. 7–12, an alternative embodiment of the invention is illustrated. This embodiment also employs a single protruding member to serve both as a dispensing nozzle and valve member operator. This valve structure, however, has a slightly different arrangement of the valve body inlet ports and the communicating port of the valve member. The spherical valve member 140 has a single inlet port 142 which communicates with a central bore 144 that extends partially into the valve member. The bore 144 is splined in portion 146 and open to an enlarged diameter bore 148. The ball member receives a single protruding member 150 having a polygon outer shape at portion 152 and an enlarged diameter end 154 which is received in the large diameter bore 148. The lower end of the single protruding member 150 is splined at 156 and is received in the internally splined portion 146 of bore 144. The assembly is preferably secured by a snap ring which is seated in the annular groove 158 about the upper edge of the bore 144. A seal in the form of an O-ring is seated in annular groove 160 about the large diameter circular portion 154 of the single protruding member 150.

The spherical valve member of FIG. 7 is received in a hemispherical valve cavity 162 illustrated in FIG. 8. This valve cavity has inlet ports 164 and 166 which are in closely spaced relationship. The spacing between inlets 164 and 166 is preselected such that the inlet port 142 of the valve member can overlie both of these ports and thereby effect proportionating of flow from ports 164 and 166 through the faucet.

The aforedescribed valve member and valve body are employed with the valve member guide ring 168 shown in FIG. 9. This guide ring has a central aperture 170 in the form of an elongated slot having an arcuate rear edge 172 and a pointed forward edge 174. The guide ring has the standard detenting tab 176 which is received in the groove such as groove 103 of FIG. 2.

FIG. 10 illustrates the relative position of the single protruding member in the aperture 170 of the guide ring 168 when the valve member is in the closed position. In this position, the generally diamond-shaped portion 152 of the single protruding member 150 is received in the pointed forward end 174 of slot 170. This position locates the single inlet port 142 of the valve member 140 beyond the inlet ports 164 and 166 of the valve body; see FIG. 8.

When the single protruding member 150 is moved to the rear portion 172 of the slotted aperture 170, in the position shown in phantom lines at 176, the valve is open and port 142 registers with both ports 164 and 166, effecting an equal proportionating of flow from these inlet ports. The rotation of the single protruding member 150 to the left, to the position shown in the phantom lines 178 will move the valve member inlet port 142 into registration with inlet port 166 and out of registration with inlet port 164, thereby obtaining the flow entirely through inlet port 166. Similarly, rotation of the single protruding member 150 to the right, to the position shown by the phantom lines 180 will move the port 142 into registration only with inlet port 164. Between these limited full positions, the valve functions as a mixing valve and infinite proportionating of flow from the two inlet ports 164 and 166 can be achieved.

The movement of the valve member 140 is also controlled by the guide slot 182, shown in FIGS. 7 and 12. This guide slot receives a coacting pin such as pin 100 of FIG. 2 that is carried by the valve body to limit the rotational freedom of the valve member 140 in the hemispherical cavity 162 of its respective valve body.

The invention as thus described employs a minimum of structural elements and combines a flow through nozzle with a valve member handle. Preferably, the faucet is employed in combination with an aerator and, most preferably, in combination with an adjustable flow deflector that is distally carried by the faucet-handle element. This construction permits the faucet to be employed in a double sink, located in the center of the sink and the flow deflector can be moved to the right or left to direct the flow to either of the basins of the sink. The nozzle-handle member of the faucet is thus located directly above the divider in the double sink and does not present any obstructions to access to the separate basins of the sink. While the invention has been described and illustrated with an assembly of a spherical valve member and nozzle-handle, it is apparent that this assembly could be provided as a single unitary structure, again greatly simplifying the manufacturing of the faucet.

The invention has been described with reference to the illustrated and presently preferred embodiments. It is not intended that the invention be unduly limited by this description of the presently preferred embodiments. Instead, it is intended that the invention be defined by the means, and their obvious equivalents, set forth in the following claims.

What is claimed is:

1. In a faucet for the dispensing of a single stream of controllable proportions of at least two fluid streams and having a body with a hemispherical cavity receiving a spherical valve member having a single outlet port and inlet port means communicating therewith and sealingly secured in said cavity by an annular seal and annular cover member assembly removeably attached to said body, at least two inlet ports communicating with said cavity through seal wells and annular seal means received in each of said seal wells and biased therein against the opposed surface of said spherical valve member; the improvement which comprises:
a single member secured to and received in the single outlet port of said spherical valve member and projecting through said annular seal and annular cover member, said single member being tubular to function as the dispensing nozzle and as the valve member operator of said faucet.

2. The faucet improvement of claim 1 wherein said single member has a bend intermediate its length to provide a generally upright leg and a generally lateral leg.

3. The faucet improvement of claim 1 wherein said single member distally bears a directionally adjustable flow deflector.

4. The faucet improvement of claim 3 wherein said flow deflector comprises a discharge nozzle having a generally spherical neck received and sealingly secured in a hemispherical receptacle distally carried on said single member.

5. The faucet improvement of claim 4 including aeration means attached to said discharge nozzle.

6. The faucet improvement of claim 1 wherein the received end of said single member is of increased diameter to provide an annular shoulder received in the central bore of said spherical valve member and including coacting clip means secured in said valve member to retain said single member.

7. The faucet improvement of claim 6 wherein the received end of said single member bears spline means and is received in coacting spline means on the inner wall of said central bore.

8. The faucet improvement of claim 6 wherein said increased diameter of said single member bears a peripheral groove to receive an O-ring for sealing said member in said central bore of said spherical valve member.

9. The faucet improvement of claim 4 wherein the spherical valve member at the end of the single member can be operated by the index finger of one's hand.

10. The faucet improvement of claim 4 wherein said single member locates said discharge nozzle to permit its adjustment by the thumb and middle finger of one's hand.

11. The faucet improvement of claim 9 wherein the spherical valve member and the discharge nozzle are both adjusted at the same time as said single member is raised to "on" or lowered to "off".

12. The faucet improvement of claim 1 wherein said body has a neck portion to be received in the aperture of a sink and further including a retainer clamp seated in a peripheral groove about said neck.

13. The faucet improvement of claim 12 further including fastener means threadably received in apertures of said retainer clamp to bear against the undersurface of a sink and secure the assembly.

14. The faucet improvement of claim 1 wherein said spherical valve member has a surface groove and wherein said body bears a pin protruding into said hemispherical cavity, into registration with said surface groove of said spherical valve member.

15. The faucet improvement of claim 1 wherein said spherical valve member has one through bore comprising inlet ports communicating with said single outlet port.

16. The faucet improvement of claim 1 wherein said spherical valve member has two through bores comprising inlet ports communicating with said outlet port.

17. The faucet improvement of claim 15 wherein said single protruding member has a polygon outer shape adjacent the end received in said spherical valve member.

18. The faucet improvement of claim 17 wherein said single protruding member has a generally diamond cross-sectional shape adjacent the end received in said spherical valve member.

19. The faucet improvement of claim 16 wherein said spherical valve member has a surface guide slot and said valve body bears a pin protruding into said hemispherical cavity into engagement with said guide slot.

20. The faucet improvement of claim 1 wherein the spacing between said inlet ports is preselected relative to said inlet port means and said surface guide slot to permit said inlet port means to overlie either or both said inlet ports to effect proportionating of flow therefrom.

21. The faucet improvement of claim 1 wherein said annular seal has a bulbous rim at its lower rim.

22. The faucet improvement of claim 1 wherein said seal wells comprise enlarged diameter counterbores which removeably receive said annular seals, the latter comprising assemblies of cylindrical inserts each having a through bore and enlarged diameter counterbore that receives a coil spring and a cylindrical seal member.

* * * * *